June 9, 1953  J. C. PETREA  2,641,435
MATERIAL DISCHARGING MEANS
Filed Aug. 3, 1951  4 Sheets-Sheet 1

INVENTOR
James C. Petrea
BY Bacon & Thomas
ATTORNEYS

INVENTOR
James C. Petrea
BY
Bacon & Thomas
ATTORNEYS

Patented June 9, 1953

2,641,435

UNITED STATES PATENT OFFICE 2,641,435

MATERIAL DISCHARGING MEANS

James C. Petrea, Durham, N. C., assignor to Wright Machinery Company, Durham, N. C., a corporation of North Carolina Application August 3, 1951, Serial No. 240,254

11 Claims. (Cl. 249—45)

This invention relates to material weighing apparatus and particularly to apparatus for rapidly weighing successive charges of material and including means for rapidly removing weighed material from the weighing pan to thereby shorten the time required for a complete weighing and material discharging cycle.

In general the invention comprises a weighing pan suitably supported for weighing movement on a portion of a weighing mechanism. The weighing pan is provided with a cylindrically concave bottom adapted to receive and support the material to be weighed. Over the weighing pan and mounted for rotation on a horizontal axis is a turret structure having a plurality of radially extending paddles mounted thereon. The paddles are equally spaced angularly about the axis of the turret and are each of a shape generally complementary to the shape of the weighing pan. The mechanism further includes control means responsive to completion of a weighing cycle, that is, means responsive to movement of the weighing pan to a predetermined lower position reached when the desired weight of material has been deposited therein. The control means responsive to the completion of a weighing cycle are so arranged as to cause actuation of elements that are moved to engage and lift the weighing pan and position the same against fixed stops to thereby hold the pan against movement. Preferably, but not necessarily, the pan is fixed to the weighing mechanism. The control means further effect rotation of the turret through a partial rotation of sufficient extent to cause one of the paddles to move across the weighing pan and sweep weighed material therefrom into a discharge spout or other apparatus. A constantly rotating motor is connected by means of a friction slip clutch to the turret and tends to drive the paddles in material sweeping direction at all times. A latch, releasable by the control means, holds the turret against rotation during the weighing cycle but is momentarily released by the control means to permit movement of one paddle across the pan. The same motor furnishes power for the means moved into engagement with the pan to hold the same against movement and the holding means are caused to engage and hold the pan against movement after weight is made but prior to the movement of the paddle across the weighing pan. After completion of a material discharging cycle the pan holding means are again released to release the pan to the weighing mechanism for another weighing cycle.

It is, therefore, an object of this invention to provide an improved and novel high speed weighing apparatus having improved means for removing weighed material therefrom.

Another object of this invention resides in the particular arrangement of parts designed for high speed operation.

A still further object of this invention resides in the provision of material removing means, in a weighing mechanism, in which a minimum mass is moved during the material removing or discharging cycle.

A still further object of this invention is to provide high speed material removing means for a weighing apparatus which means are simple in construction and relatively inexpensive to produce.

Still further objects and advantages will appear to those skilled in the art as the description proceeds in connection with the accompanying drawings wherein.

Figure 1:
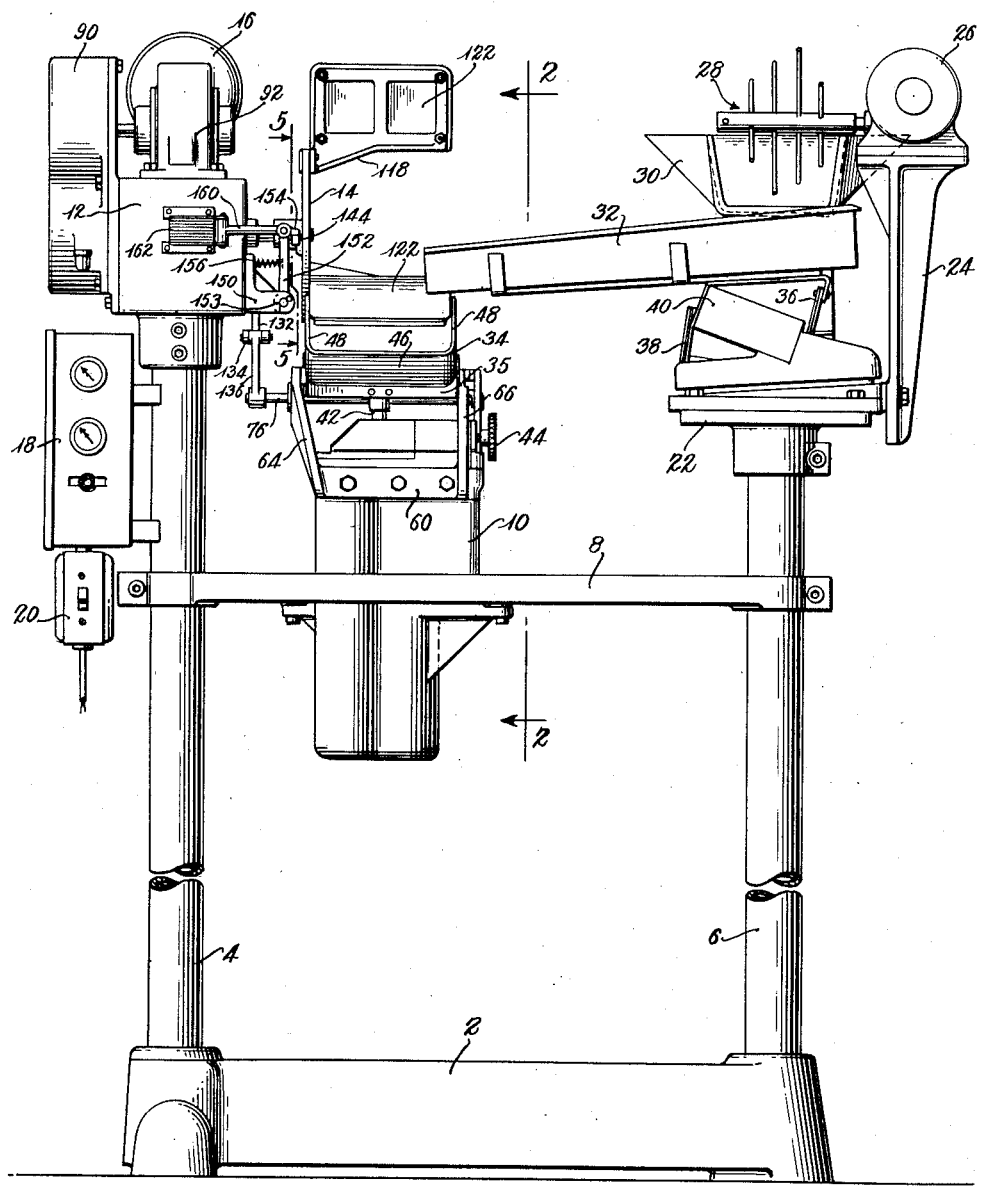
Fig. 1 is a side elevational view of an apparatus embodying the present invention with the cover plate and discharge spout removed.

Referring first to Fig. 1 there is shown therein an apparatus including a T-shaped base 2 having a pair of upstanding posts 4 and 6 fixed thereto. At an intermediate elevation a bridging member or bracket 8 is clamped to each of the posts 4 and 6 and extends thereacross providing a support for a weighing unit 10. The uppermost portion of the post 4 supports a housing 12 in which drive mechanism for a turret 14 is located. A motor 16 is mounted on the housing 12 and is provided with drive connections to the mechanism within the housing. The post 4 also supports suitable control boxes 18 and 20.

The upper portion of the post 6 supports a bracket 22 carrying a bracket 24 on which a feed motor 26 is mounted. The feed motor 26 drives a material levelling means 28 located at the discharge end of a vibratory chute 30. Material discharged from the vibratory chute 30 is deposited in a second vibratory chute 32 which feeds material to be weighed to a weighing pan 34 movably carried on the weighing unit 10. The vibratory chutes 30 and 32 are mounted on the bracket 22. Material may be supplied to the vibratory chute 30 in any convenient manner such as by a hopper or the like. The vibratory chutes 30 and 32 are of a well-known type and need not be described in detail. For example, the chute 32 may be supported for longitudinal vibratory movements by means such as leaf springs 36 and 38. An electro-magnetic device 40 is arranged to cause high speed longitudinal vibratory movements of the chute to advance material therealong in a substantially uniform stream, it being understood that the chute 30 is similarly supported and vibrated. As previously stated the discharge end of the chute 32 overlies weighing pan 34 whereby material fed by the chute 32 is deposited in the weighing pan at a predetermined and substantially uniform rate. Suitable control means in the control box 18 are adapted to regulate the rate of feed such as by controlling the magnitude of the vibrations imparted to chutes 30 and 32, by means of variable rheostats, by their electromagnetic elements 40. The necessary electrical conductors and connections have been omitted from the drawings to avoid undue confusion. The material leveling means 28 may be vertically adjusted a small amount by means of slots (not shown) in bracket 24 where that bracket is fastened to bracket 22.

The weighing unit 10 is of a known type such as described in detail in U. S. Patent No. 2,522,767. It comprises generally a tank containing a quantity of oil or other suitable liquid and a float mechanism buoyantly supported by the oil. The float mechanism has an upwardly extending shaft 42 fixed thereto and to the upper end of which the weighing pan 34 is fixed by means of a channel or bar 35 fixed to shaft 42 and spot welded or otherwise secured to the bottom of pan 34. A suitable mercury switch within the tank structure is closed upon downward movement of the shaft 42 to a predetermined position, which position is attained upon completion of a weighing cycle, that is, upon depositing the required weight of material in the pan 34. A control member actuated by a knob 44 is effective to change the level of the liquid in the tank to thereby adjust the range of movement of the weighing mechanism and the weight of material necessary to close the mercury switch.

Figure 2:
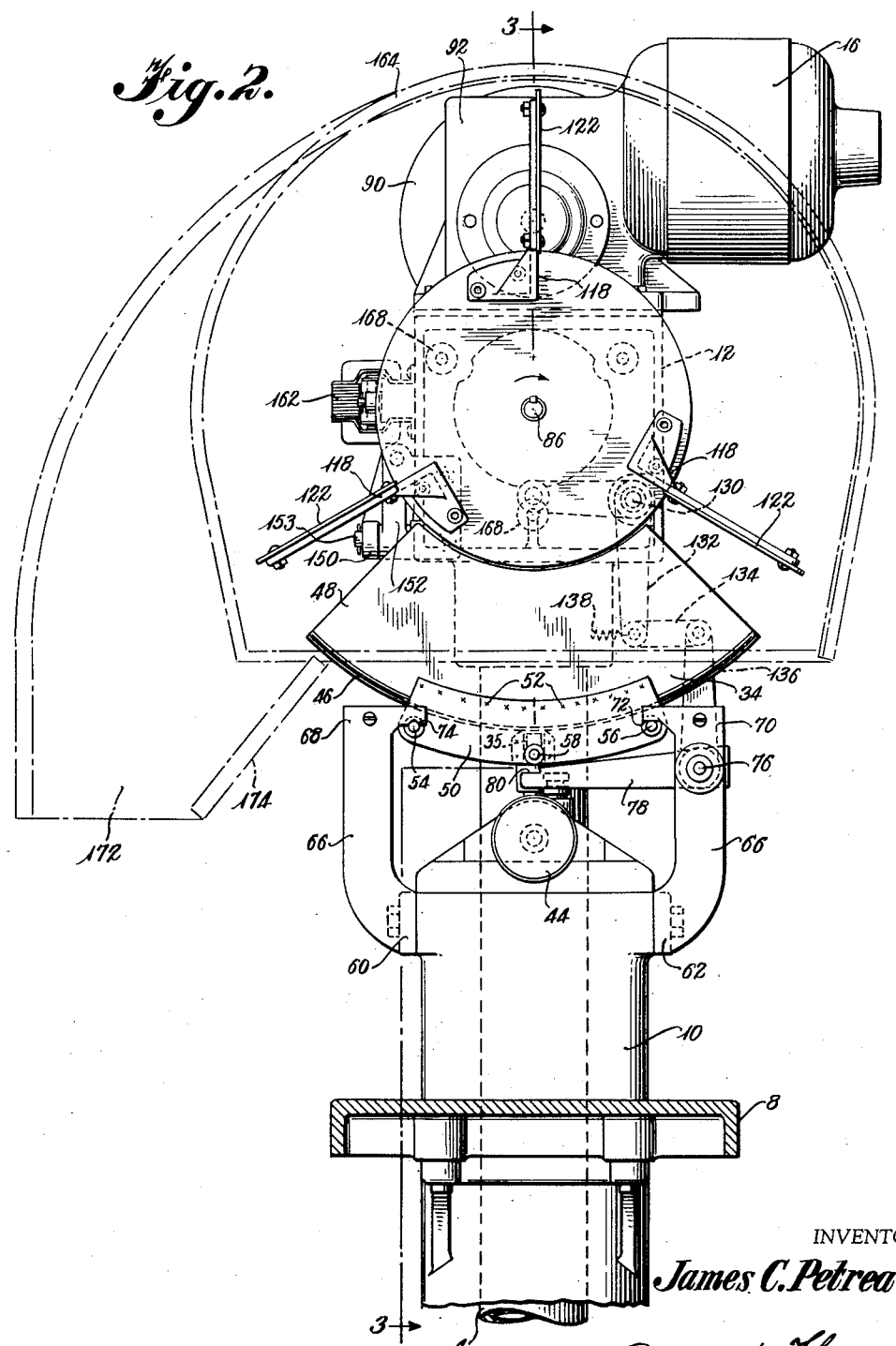
Fig. 2 is a sectional view taken substantially along the line 2—2 of Fig. 1 with the cover plate and discharge spout shown in dotted lines and with the material feeding mechanism omitted.

Referring now to Fig. 2, the weighing pan 34 is shown therein in side elevation and includes a cylindrically concave bottom wall 46 and side walls 48 upwardly extended from the concave or arcuate edges of the bottom wall 46. No end walls are provided since the end edges of the bottom wall 46 are sufficiently higher than the mid-portion thereof to constitute retaining means for material deposited in the pan. At the lower edges of the walls 48 and substantially centrally between the ends thereof downwardly projecting plates 50 are mounted as by spot welding at 52 to the outer faces of the side walls 48. Each of the plates 50, there being one on each side of the pan 34, carries a pair of outwardly extending stops or pins 54 and 56 and each plate 50 is further provided with an outwardly extending central pin 58. A pair of brackets 60 and 62 are fixedly mounted on the unit 10 and each includes a pair of upwardly extending arms 64 and 66. Each of the arms 64 and 66 is provided at its upper end with inwardly extending abutments 68 or 70. Each of the abutments 68 and 70 extends inwardly to a position above the corresponding stop pins 54 and 56. As shown in the drawings the abutments 70 is provided with a downwardly facing plane surface 72 overlying pin 56 while the abutments 68 are each provided with downwardly facing V-notch 74 over the corresponding pin 54.

It is contemplated that the vertical position of the abutments 68 and 70 is such that pan 34, when empty, will be lifted by the float member in the weighing unit 10 to a position wherein the stop pins 54 and 56 engage their respective abutments. While it is preferred that the "unloaded" position of the weighing pan be as described, such is not necessary. The abutments 68 and 70 may be positioned at a greater elevation than that described but within the range of possible movement of the pan 34 so that the latter may be lifted sufficiently to engage the stop pins 54 and 56 with the abutments 68 and 70.

The arms 64 and 66 of bracket 62 are provided with aligned bearings 75 rotatably supporting a rock shaft 76 extending through both arms 64 and 66 of the bracket 62. The rock shaft 76 is provided adjacent each end inwardly of the arms 62 and 64 with lever arms 78 fixed to the shaft for rocking movement therewith. The lever arms 78 extend inwardly over the unit 10 and are provided at their free ends with shoulders or seats 80 underlying the central pins 58 on brackets 50.

Figure 3:
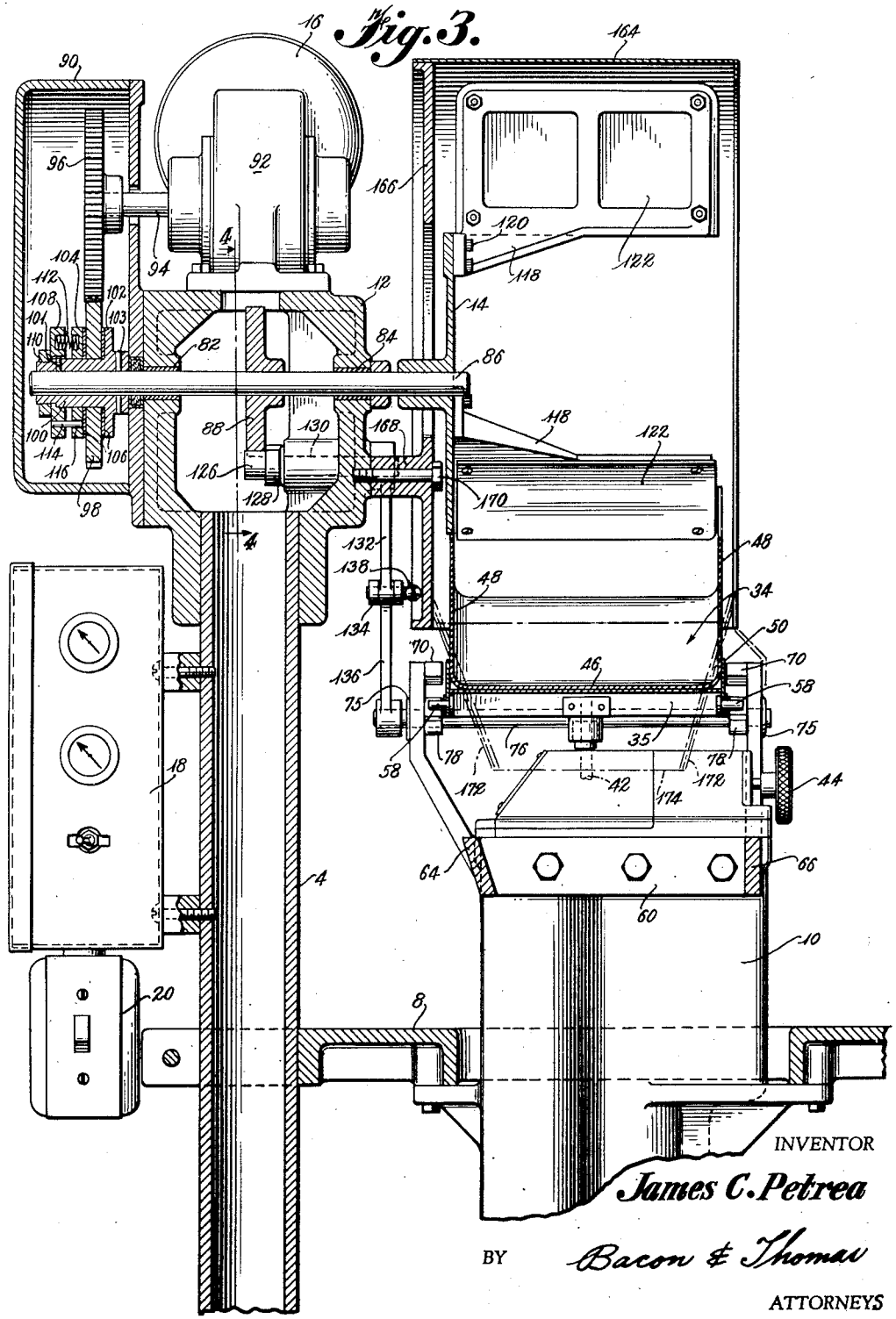
Fig. 3 is a sectional view taken substantially along the line 3—3 of Fig. 2.
Figure 4:
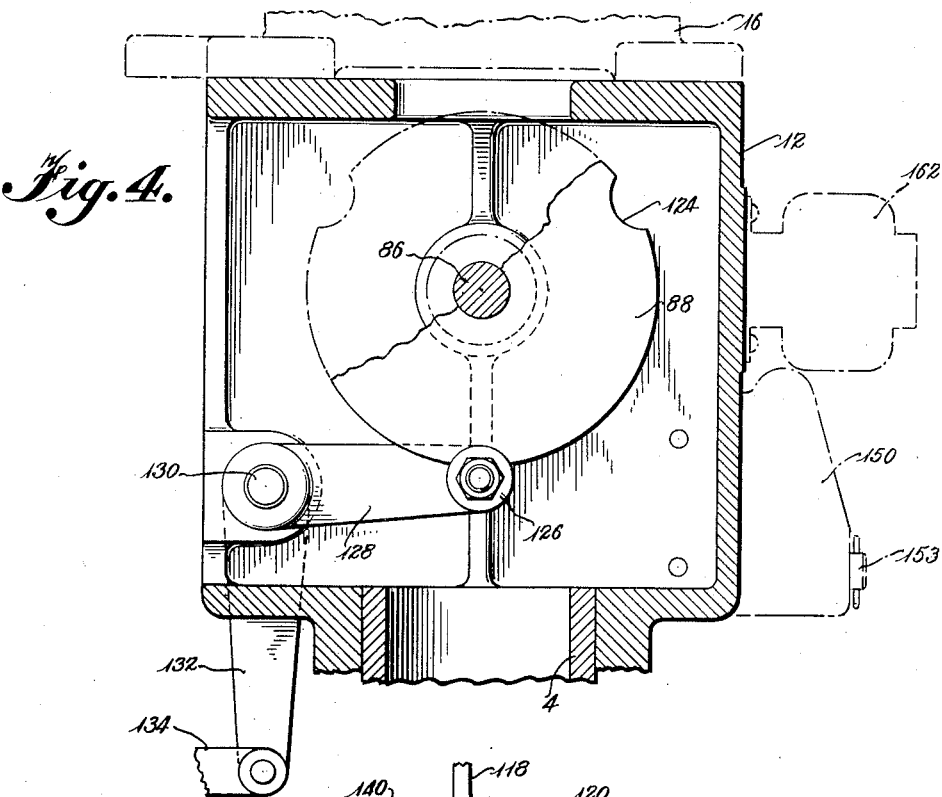
Fig. 4 is a fragmentary sectional view, on an enlarged scale, taken substantially along the line 4—4 of Fig. 3; and, Fig. 5 is a fragmentary sectional view on an enlarged scale taken substantially along the line 5—5 of Fig. 1.
Figure 5:
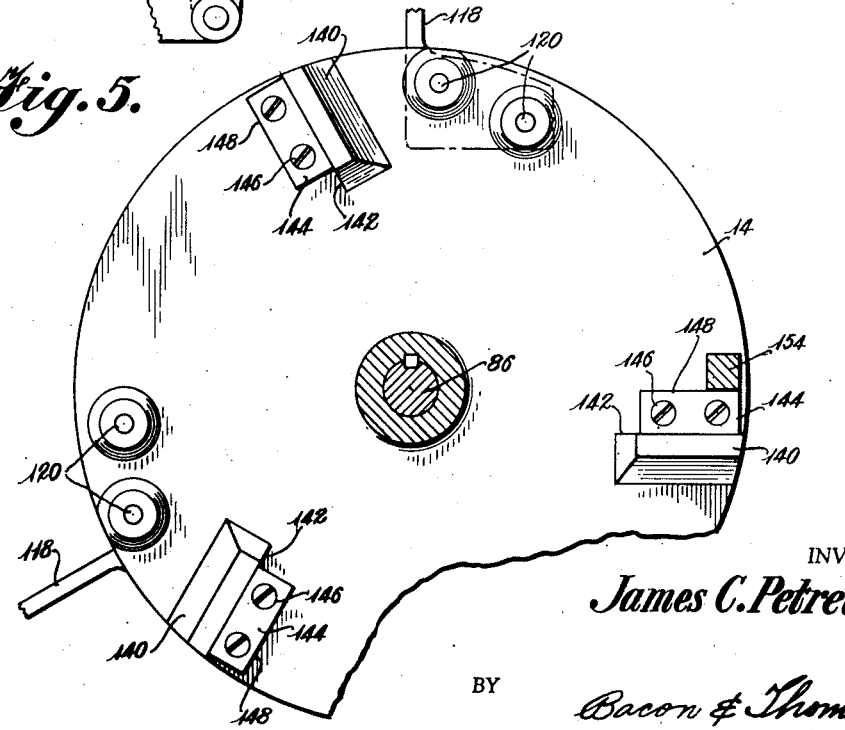

Referring now particularly to Figs. 3, 4, and 5, the housing 12 previously referred to is shown in section and includes bearings 82 and 84 rotatably supporting a horizontal shaft 86. The shaft 86 has the turret 14 keyed or otherwise fixed thereto and is further provided with a cam 88 keyed or otherwise fixed thereto within the housing 12. The opposite end of the shaft 86 extends into a housing 90 enclosing a driving mechanism connecting the motor 16 to the shaft 86. As shown the motor 16 includes a speed reducing mechanism 92 as an integral part thereof and the speed reducing mechanism causes an output shaft 94 to rotate continuously. A drive gear 96 is keyed or otherwise fixed to the shaft 94 within the housing 90 and meshes with a second gear 98 freely rotatable on a hub 100. The hub 100 is fixed to the shaft 86 such as by taper pin 103 or the like. Adjacent its inner end the hub 100 is provided with a flange 102 which projects radially beyond the outer surface of the hub 100 to provide a face adjacent one side of the gear 98. A friction drive shoe 104 is slidably mounted on the hub 100 and comprises an annular ring of substantially the same radial extent as the flange 102 but is positioned on the opposite side of the gear 98. The gear 98 may be provided with suitable friction facings 106 cemented thereto between the side faces thereof and the flange 102 on one side and drive shoe 104 on the other. A pressure plate 108 is also slidably mounted on the hub 100 but is keyed thereto such as by having a key slot engaging the outer end of a pin 101 in hub 100. An adjusting collar 110 is threaded to the end of the hub 100 in position to engage the pressure plate 108 and to adjust the axial position thereof. The pressure plate 108 and the drive shoe 104 are provided with opposed recesses receiving the ends of compression springs 112 acting to force them apart. Since the collar 110 prevents rearward movement of the pressure plate 108 the springs 112 cause drive shoe 104 to press against the face of gear 98 and hold the gear in frictional engagement with the flange 102. The pressure plate 108 may be provided with axially extending pins 114 extending loosely into openings 116 in the drive shoe 104 to thus key the drive shoe to the pressure plate 108, hub 100, and shaft 86. While the drawings show a single pin 114 and a single spring 112 it is to be understood that a plurality of each is contemplated, they being angularly spaced about the axis of the shaft 86. It will be apparent that the structure thus far described provides a driving connection between the motor 16 and the shaft 86 through a friction slip clutch and that the turret 14 will be driven in rotation when the resistance to such drive does not exceed the power capable of being transmitted through the friction slip clutch. Clearly if means are provided to positively prevent rotation of the turret 14 the motor 16 and gears 96 and 98 may continue to rotate but the gear 98 may slip relative to the drive shoe 104 and flange 102 while the shaft 86 is thus held stationary.

The turret 14 carries a plurality of brackets 118 mounted thereon by such means as screws 120. Each of the brackets 118 defines a framework having a surface extending radially of the shaft 86 and a suitable paddle 122 is fixed to each of the bracket frames 118 and projects peripherally therebeyond a slight amount. Each of the paddles 122 is of an outline complementary to the transverse sectional shape of the inside of weighing pan 34 and is arranged to be received between the side walls 48 with only slight clearance therebetween. The radius from the axis of shaft 86 to the outermost edges of the paddles 122 is substantially equal to the radius of curvature of the cylindrical bottom wall 46 of weighing pan 34 and the axis of the shaft 42 upon which the pan 34 is mounted intersects the axis of the shaft 86 so that in a certain elevated position of the pan 34 the bottom wall thereof is concentric to the axis of shaft 86. The described position of the pan 34 in which its bottom wall is concentric to the shaft 86 is that position the pan occupies when the stop pins 54 and 56 engage their respective abutments 68 and 70. It will thus be seen that when the pan 34 is elevated to position stop pins 54 and 56 against their respective abutment members and turret 14 is rotated the outer edges of the paddles 122 will "sweep" the inside of pan 34. As previously stated it is contemplated that the dimensions be such that only slight clearances are provided between the outer edges of paddles 122 and the bottom wall during such sweeping movement. The paddles are thus effective to sweep the material from the pan 34 over one of the end edges of the bottom wall thereof.

The cam 88 previously referred to is of generally circular configuration (see Fig. 4) but is provided with equally spaced depressions or recesses 124 in its periphery. The recesses 124 are equally spaced about the axis of shaft 86 and are equal in number to the number of brackets 118 and paddles 122 on the turret 14, which latter are also equally spaced. The depressions or recesses 124 are preferably of the same configuration as a cam follower roller 126 rotatably carried by the end of an arm 128 fixed to a rock shaft 130 journalled in the housing 12. The rock shaft 130 also has fixed thereto, externally of the housing 12, a lever 132 pivoted to one end of a link 134. The other end of link 134 is pivoted to an end of an arm 136 fixed to the innermost end of shaft 76, previously described. A spring 138 (see Fig. 2) is arranged to bias the linkage just described in such direction as to urge the cam follower 126 against the periphery of cam 88 and at the same time urge the shaft 76 to rotate in such direction that the free end of arm 78 is caused to move downwardly away from the pin 58 on plate 50. The dimensions and relation of the parts are such that when cam follower roller 126 is in one of the depressions 124 the shoulder 80 of lever 78 is moved to a lower position well below the normal range of movement of the pin 58 during weighing movements of the weighing mechanism. The position of the shoulder 80 is such that the pan 34 moves to a lower position to close the mercury switch in tank 10, previously referred to, while pin 58 is still some distance above the shoulder 80 and out of contact therewith.

Referring now to Figs. 1 and 5, it will be seen that the turret 14 is provided on the surface thereof adjacent housing 12 with a plurality of spaced bosses 140. The bosses 140 may be integral with the turret 14 which may be a cast structure if desired. There are the same number of bosses 140 on the turret as there are paddles 122 which in turn equal the number of depressions 124 in cam 88. Each of the bosses 140 may be accurately machined to provide reference surfaces 142 against which stop members 144 are positioned and fixed to the turret 14 as by means of screws 146. Each of the stop members 144 defines a surface 148 accurately positioned with reference to the paddles 122 and equally spaced about the axis of shaft 86. A bracket 150 (see Fig. 1) is fixed to the side of the housing 12 adjacent the turret and pivotally carries a latch arm 152 having a latching portion 154 at its free end. The axis of the pivot 153 by which latch arm 152 is mounted is such that the latch arm may swing toward and from the rear face of turret 14. A compression spring 156 is arranged between the bracket 150 and the arm 152 and biases the arm to swing in such direction as to project the latching portion 154 toward the turret 14 and the bracket 150 is so positioned that the latching portion 154 is projected into the path of movement of stop members 144 to engage the surfaces 148 thereof. The motor 16 and drive mechanism connected thereto tend to rotate shaft 86 in a counterclockwise direction as viewed in Fig. 5 (in a clockwise direction as viewed in Fig. 2) and with the stop faces 148 facing forwardly in the direction of movement. When the spring 156 projects latch member 154 to its latching position, the latching member will engage a face 148 and hold the turret against rotation. When the turret 14 is thus held against rotation by engagement of latch 154 with a surface 148 the cam 88 is in such position that the cam follower roller 126 is in one of the depressions 124 and thus levers 78 are in their lowermost position to free the weighing pan 34 for weighing movement.

As evident from Fig. 2 the peripheral spacing between the paddles 122 is greater than the arcuate length of the weighing pan 34, and thus the paddles 122 at the lowermost part of the turret are positioned so that each is outwardly of the respective ends of the pan 34 and clear thereof. The shape of cam 88 and depressions 124 is such that a very small angular rotation of the cam will cause the cam follower 126 to move to the outermost periphery of the cam and thus rock lever 78 clockwise as viewed in Fig. 2 to engage shoulder 80 with pin 58 and move the entire weighing structure upwardly to the limit of its movement before the paddle 122 starts to enter between the side walls of the weighing pan. The radial "throw" of the cam 88 is sufficiently great to lift the weighing pan, through the medium of lever 78, to position stop pins 54 and 56 against abutments 68 and 70 and to firmly hold them thereagainst to rigidly hold pan 34 against movement during the sweeping cycle of the paddles. The V-notch 74 in abutment members 68 prevents lateral displacement of the pan 34 during sweeping movements of the paddles and thus prevents bending of shaft 42 or the application of undesirable stresses to that shaft and the internal mechanism of the weighing unit 10. Since the portions of cam 88 between the depressions 124 are concentric to the shaft 86 it will be seen that rotation of shaft 86 through one step will maintain the pan 34 in its upper fixed position during the entire movement of the shaft 86 through one partial rotation.

The latch lever 152 previously described is pivoted to an actuating link 160 which is in turn connected to the movable armature of a solenoid 162 mounted on the outer wall of the housing 12. It is intended that the solenoid 162 be energized upon closing of the mercury switch within the weighing unit 10 at the time a weighing cycle is completed.

Fig. 3 shows in full lines (and Fig. 2 shows in dotted lines) a guard or cover 164 extending over the turret and paddles 122. The guard 164 may be carried by the peripheral edge of a plate 166 having bosses 168 abutting the housing 12 and fixed thereto by means of cap screws 170. The cover plate 164 does not extend across the bottom of the apparatus but leaves a bottom opening through which the weighing pan 34 projects. The plate 166 carries one of a pair of side plates 172 defining the side walls of a delivery chute or discharge spout having a bottom wall 174 carried by side plates 172, inclined to the vertical and extending upwardly to a position inwardly of and below the discharge end of the curved bottom wall 40 of the weighing pan. Thus, material swept from the pan 34 by paddles 122 will be received by the chute or spout 174 and discharged from the apparatus. The weighed material thus discharged may be directed to the filling station of a container filling machine or may be disposed of in any desired manner.

The structure and mechanisms described herein above operate in the following manner:

With parts in the position indicated in Figs. 1 and 2, with the turret held stationary by latch member 154, the lever 78 is lowered to free the pan 34 for weighing movement. Material continuously fed by the vibratory chute 32 drops into and is received by the weighing pan 34 and such feed continues at all times. When sufficient material has been deposited in the pan 34 to cause the pan and the float within the unit 10 to move downwardly a predetermined distance the mercury switch (which may of course be any other suitable type of switch) is closed thus energizing a relay in box 18 which in turn closes a circuit including solenoid 162 and energizing that solenoid to exert a pull on the link 160 and to retract latch member 154 from the surface 148 of stop member 144. Upon withdrawal of the latch member 154 the turret is released to the action of the friction slip clutch in guard housing 98 and the shaft 86 is immediately driven in rotation. As the shaft 86 starts to rotate the lowermost right-hand paddle of Fig. 2 is caused to approach the weighing pan 34 but before the paddle reaches the nearest edge of the pan 34 cam follower 126 will have been moved radially outwardly and will have rocked shaft 76 and lever 78 to lift the pan 34 to a position where stop pins 54 and 56 engage their respective abutments and the pan will be held in that position until cam follower 126 drops into the next depression 124. The dimensions are such that the cam follower 126 drops into the next depression 124 just after the one paddle has completed a trip through the pan and assumed the position previously occupied by the paddle immediately thereahead. Upon entry of the follower 126 into the next succeeding depression of the cam 88 the weighing pan is again released for weighing movements. Immediately upon commencement of the material sweeping cycle of the structure described the pan 34 and associated weighing mechanism is lifted by lever 78 thus opening the mercury switch which was closed by "making weight" and the solenoid 162 is thereby deenergized. Upon the attainment of the desired weight of material in the pan the solenoid 162 is thus energized only momentarily. The period of energization is only slightly greater than that required to withdraw the latch member 154 and permit the adjacent stop member 144 and boss 140 to pass the position of the latch which later is then released and positioned by spring 156 in the path of the next succeeding surface 148 on the next succeeding stop member 144. When that next succeeding stop member reaches the position of the latch element 154 the turret 14 is again brought to a stop and a complete cycle of material weighing and discharging will have been completed. During this time material is again accumulating in the pan 34 and a new weighing cycle is in progress.

As stated previously, the vibratory chute 32 continuously delivers material to the weighing pan 34. The timing of the mechanism can be so arranged that the exact weight to be made is accumulated in the weighing pan at the time a paddle plate 122 moves past the delivery end of chute 32. The material being swept ahead of the paddle 122 then constitutes the exact amount of material to be weighed and that falling behind the paddle 122 onto weighing pan 34 constitutes material being accumulated for the next weighing cycle. The switch actuated by downward movement of the weighing pan may be so adjusted as to be closed slightly before the desired weight of material has actually accumulated and the correct weight will have accumulated by the time paddle 122 passes the delivery end of chute 32.

The arrangement of parts described will clearly be seen to be such that relatively small acceleration forces are involved and only relatively small masses need be accelerated, thus permitting unusually high operating speeds.

While a single specific embodiment of the invention has been described herein, it is to be understood that many modifications and equivalents may be resorted to without departing from the scope of the invention as defined by the appended claims.

I claim:

1. In a weighing apparatus; a stationary frame having an abutment thereon, a material receiving pan mounted for weighing movement on said frame, stop means fixed on said pan, the said abutment being in alignment with the path of movement of said stop means, holding means operable in response to completion of a weighing cycle to move said pan along said path and engage and hold said stop means against said abutment and thereby to hold said pan in a predetermined position, and further means movably mounted on said frame for movement across and closely adjacent the material-holding surface of said pan to sweep weighed material therefrom while said stop means is held against said abutment.

2. In a weighing apparatus; a stationary frame, a material receiving pan mounted for weighing movement on said frame, said pan having an upwardly concave arcuate bottom and side walls extending upwardly from the concave edges thereof, a member rotatably mounted on said frame above said pan on a generally horizontal axis and being shaped substantially complementary to the transverse shape of said pan between said side walls, means operable in response to completion of a weighing cycle for engaging said pan and holding it against movement in a position with its bottom wall substantially concentric to said axis, and means for rotating said member through said pan and between the side walls thereof while said pan is held against movement.

3. A weighing apparatus as defined in claim 2 wherein said member comprises one of a plurality of paddles angularly spaced about said axis and fixed to a rotary structure, and latch means for cyclically engaging and releasing said structure to hold said structure against rotation and with said paddles clear of said pan during a weighing cycle, said latch means being arranged to release said structure for a partial rotation at the completion of each weighing cycle whereby successive paddles sweep successive charges of weighed material from said pan.

4. In a weighing apparatus; a frame, a material receiving pan mounted for weighing movement on said frame, said pan having an upwardly concave cylindrically curved bottom wall, a structure mounted on said frame for rotation over said pan and about an axis parallel to the axis of curvature of said bottom wall, a paddle carried by said rotary structure, stop means on said pan, abutment means on said frame in alignment with the path of movement of said stop means, holding means movably mounted on said frame and arranged to engage said pan and move the same to engage and hold said stop means against said abutment means, the said parts being so positioned that said cylindrically curved bottom wall is concentric to said axis when said stop means engage said abutment means, and said paddle being so dimensioned that its outer edge moves closely adjacent said bottom wall when said rotary structure is rotated about said axis with said stop means engaging said abutment means.

5. In a weighing apparatus; a frame, a generally horizontal rotary shaft on said frame, drive means for rotating said shaft, a support on said shaft, a plurality of circumferentially spaced radial paddles carried by said support, a material receiving pan mounted for substantially vertical weighing movement on said frame below said paddles, stop means fixedly carried by said pan, abutment means carried by said frame above said stop means, holding means movably carried by said frame and arranged to move said stop means against said abutment means and hold said pan stationary in a predetermined position, control means to cause said holding means to so hold said pan and to cause said drive means to rotate said shaft sufficiently to move one paddle across said pan with the outer edge of said paddle moving closely adjacent the surface of said pan to sweep weighed material therefrom.

6. In a weighing apparatus as defined in claim 5, said drive means comprising a continuously rotating source of power, friction clutch means connecting said drive means to said shaft, latch means on said frame and normally engaging said support to hold said paddles in predetermined indexed positions, said control means being arranged to momentarily disengage said latch to permit one paddle to move over said pan and sweep weighed material therefrom.

7. In a weighing apparatus as defined in claim 6, said latch means comprising a spring-pressed detent on said frame, spaced shoulders on said support, there being a shoulder for each paddle and said shoulders being engageable by said detent to hold said support against rotation, said control means being arranged to effect momentary withdrawal of said detent upon completion of a weighing cycle.

8. In a weighing apparatus as defined in claim 5, said stop means comprising projecting pins on said pan and said abutment means including a V-notch to receive one of said pins.

9. In a weighing apparatus as defined in claim 5, said holding means comprising a lever pivoted to said frame, means normally holding an end of said lever below the range of movement of said pan, a cam on said shaft, connections between said cam and lever to cause said lever to rock and lift said pan to position and hold said stop means against said abutment means while one of said paddles sweeps across said pan.

10. In a weighing apparatus; a frame, a generally horizontal rotary shaft on said frame, a constantly rotating source of power, a friction slip clutch connecting said source of power to said shaft, a support on said shaft, a plurality of circumferentially spaced radial paddles carried by said support, circumferentially spaced shoulders on said support, there being a shoulder for each of said paddles, a latching detent on said frame and means biasing said detent to a position in the path of travel of said shoulders whereby said support and paddles are normally held against rotation, control means for momentarily withdrawing said detent to permit one of said shoulders to pass the position thereof, a material receiving pan mounted for vertical weighing movement on said frame below said paddles, said pan having an upwardly concave cylindrically curved bottom wall the axis of curvature thereof being parallel to said shaft, stop means carried by said pan, abutment means on said frame so positioned that when said stop means are held thereagainst said bottom wall is concentric to said shaft and closely adjacent the path of travel of an edge of said paddles, the arcuate extent of said bottom wall being less than the distance between the outer edges of adjacent paddles, said shoulders and detent being so positioned that said support is held stationary, during weighing movements of said pan, with the lowermost adjacent paddles spaced outwardly of the opposed edges of said pan, a lever pivoted to said frame, means normally holding an end of said lever below the normal range of movement of said pan, a cam on said shaft, connections between said cam and lever such that actuation of said control means to withdraw said detent causes said cam to pivot said end of said lever upwardly to engage and move said pan until said stop means engage said abutment means, the said cam being so configured that said stop means engage said abutment means before one of said paddles passes over the adjacent edge of said pan.

11. In a weighing apparatus as defined in claim 10, said control means comprising a solenoid, and means actuated by movement of said pan to a predetermined lower position for energizing said solenoid.

JAMES C. PETREA.

References Cited in the file of this patent

UNITED STATES PATENTS

| Number | Name | Date |
|---|---|---|
| 1,641,448 | Merrick | Sept. 6, 1927 |
| 1,793,169 | Forster | Feb. 17, 1931 |
| 2,324,667 | Baker | July 20, 1943 |

FOREIGN PATENTS

| Number | Country | Date |
|---|---|---|
| 603,455 | France | Jan. 9, 1926 |
| 850,794 | France | Sept. 18, 1939 |